United States Patent [19]
Saylor, Jr.

[11] Patent Number: 6,103,053
[45] Date of Patent: Aug. 15, 2000

[54] METHOD FOR MAKING A SLIP-RESISTANT COVER SYSTEM

[76] Inventor: Edward T. Saylor, Jr., 1025 33rd Ave. SW., Vero Beach, Fla. 32968

[21] Appl. No.: 09/050,016

[22] Filed: Mar. 30, 1998

Related U.S. Application Data

[60] Division of application No. 08/712,556, Sep. 13, 1996, Pat. No. 5,787,655, which is a continuation-in-part of application No. 08/431,823, May 1, 1995, Pat. No. 5,613,332, which is a continuation of application No. 07/943,554, Sep. 11, 1992, abandoned.

[51] Int. Cl.⁷ .............................. B32B 31/12; B05D 5/00
[52] U.S. Cl. ........................ 156/280; 156/279; 427/180
[58] Field of Search ...................... 156/279, 280; 427/180, 202; 428/67, 206, 323–331, 143–150

[56] References Cited

U.S. PATENT DOCUMENTS

| | | |
|---|---|---|
| 2,057,171 | 10/1936 | Van Der Pyl . |
| 2,521,992 | 9/1950 | Nielsen . |
| 2,567,186 | 9/1951 | Cross et al. . |
| 3,267,187 | 8/1966 | Slosberg et al. . |
| 3,276,895 | 10/1966 | Alford . |
| 3,565,661 | 2/1971 | Harrison . |
| 3,579,409 | 5/1971 | Shannon . |
| 3,661,673 | 5/1972 | Merriam . |
| 3,676,208 | 7/1972 | Griffin . |
| 3,788,873 | 1/1974 | Detig . |
| 3,900,605 | 8/1975 | Norris, Jr. ............................ 427/202 X |
| 3,915,771 | 10/1975 | Gatzke et al. ....................... 428/325 X |
| 3,917,501 | 11/1975 | Ferrucci et al. . |
| 4,018,944 | 4/1977 | Hallstrom et al. . |
| 4,239,797 | 12/1980 | Sachs .................................. 428/147 X |
| 4,272,211 | 6/1981 | Sabel . |
| 4,282,281 | 8/1981 | Ethen . |
| 4,292,100 | 9/1981 | Higashiguchi . |
| 4,299,874 | 11/1981 | Jones et al. . |
| 4,328,274 | 5/1982 | Tarbutton et al. ....................... 428/149 |
| 4,336,293 | 6/1982 | Eiden . |
| 4,348,447 | 9/1982 | Miller, Jr. et al. . |
| 4,351,866 | 9/1982 | Mennesson et al. . |
| 4,359,491 | 11/1982 | Lai-Chun . |
| 4,462,853 | 7/1984 | Ringer . |
| 4,467,007 | 8/1984 | Elgie . |
| 4,528,231 | 7/1985 | Lund . |
| 4,555,292 | 11/1985 | Thompson . |
| 4,556,595 | 12/1985 | Ochi . |
| 4,584,209 | 4/1986 | Harrison . |
| 4,622,257 | 11/1986 | Thompson . |
| 4,654,099 | 3/1987 | Sandman . |
| 4,662,972 | 5/1987 | Thompson . |
| 4,664,735 | 5/1987 | Pernicano . |
| 4,689,259 | 8/1987 | Miller, Jr. et al. . |
| 4,721,649 | 1/1988 | Belisle et al. . |
| 4,725,494 | 2/1988 | Belisle et al. . |
| 4,766,032 | 8/1988 | Pernicano . |
| 4,794,020 | 12/1988 | Lussi et al. . |
| 4,849,265 | 7/1989 | Ueda et al. . |
| 4,881,999 | 11/1989 | Balmer et al. . |
| 4,897,136 | 1/1990 | Bailey et al. . |
| 4,937,127 | 6/1990 | Haenggi et al. ....................... 428/148 |
| 4,968,063 | 11/1990 | McConville et al. . |
| 5,015,516 | 5/1991 | Lussi et al. ............................ 428/143 |
| 5,039,557 | 8/1991 | White . |
| 5,059,471 | 10/1991 | McNally et al. . |
| 5,077,118 | 12/1991 | Hasegawa et al. . |
| 5,087,148 | 2/1992 | Wyckoff . |
| 5,122,212 | 6/1992 | Ferguson et al. . |
| 5,194,113 | 3/1993 | Lasch et al. ....................... 156/279 X |

(List continued on next page.)

FOREIGN PATENT DOCUMENTS 2658730  6/1978  Germany .

*Primary Examiner*—Curtis Mayes
*Attorney, Agent, or Firm*—Beall Law Offices

[57] ABSTRACT

A method for manufacturing a decorative slip-resistant cover system includes the step of impacting a softened polymer film with a plurality of beads such that a section of each bead protrudes from the softened polymer film. The softened polymer film is hardened. The sections of the beads are embedded into an upper layer of the cover system.

10 Claims, 6 Drawing Sheets

U.S. PATENT DOCUMENTS

| | | | |
|---|---|---|---|
| 5,227,221 | 7/1993 | Hedblom | 428/143 X |
| 5,453,320 | 9/1995 | Harper et al. | |
| 5,571,588 | 11/1996 | Lussi et al. | 428/144 X |
| 5,613,332 | 3/1997 | Saylor, Jr. | 52/177 |
| 5,643,655 | 7/1997 | Passarino | 428/143 |
| 5,643,669 | 7/1997 | Tsuei | |
| 5,787,655 | 8/1998 | Saylor, Jr. | 428/325 X |
| 5,807,608 | 9/1998 | O'Dell et al. | 427/202 X |

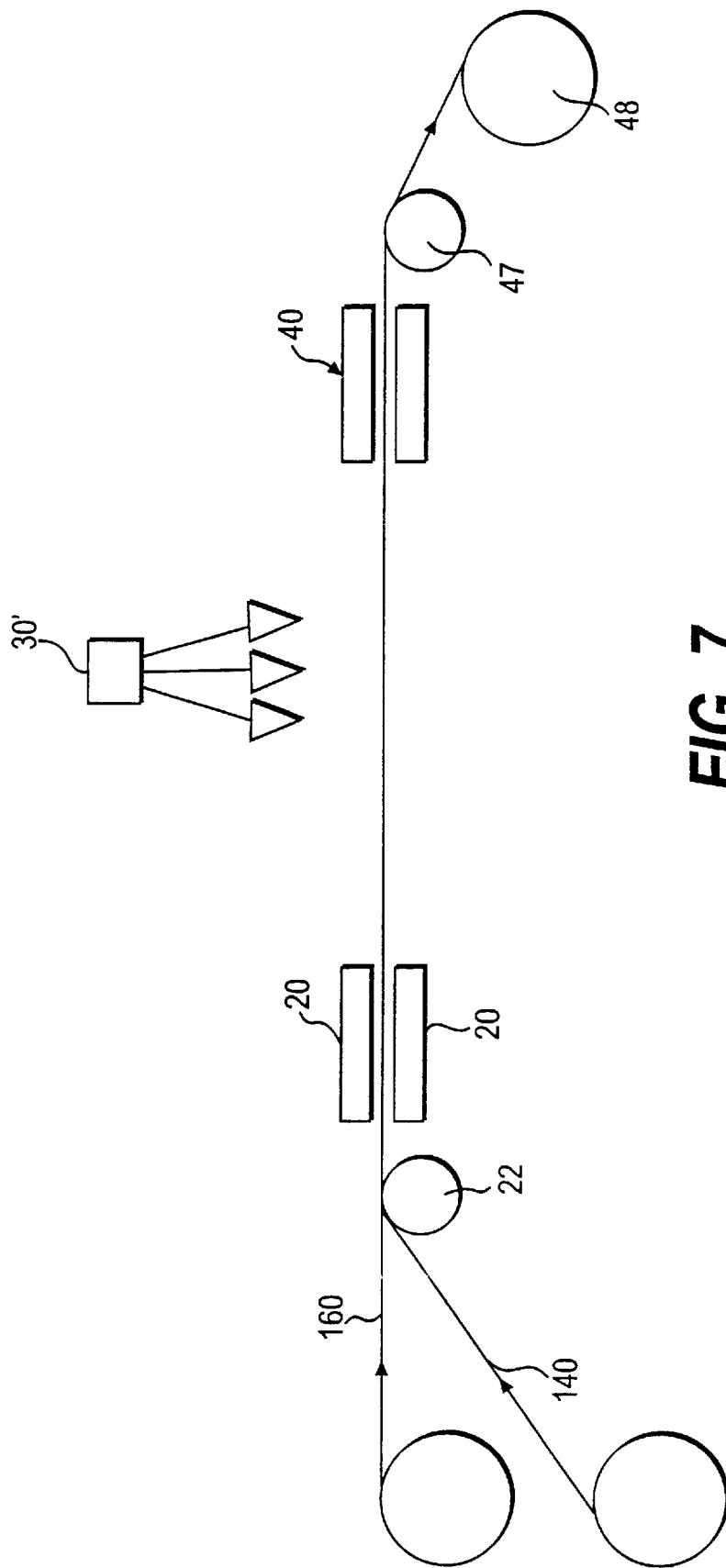

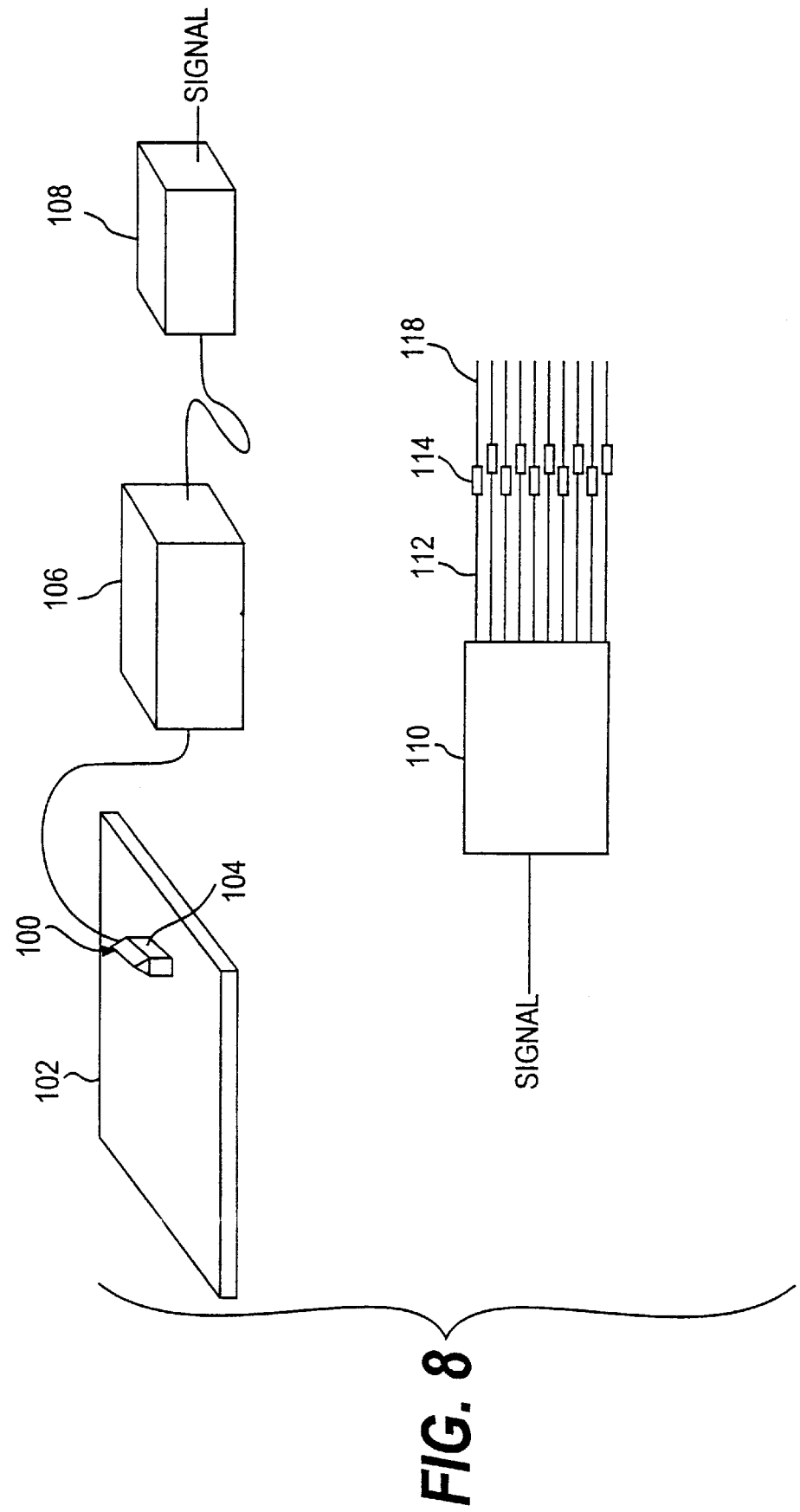

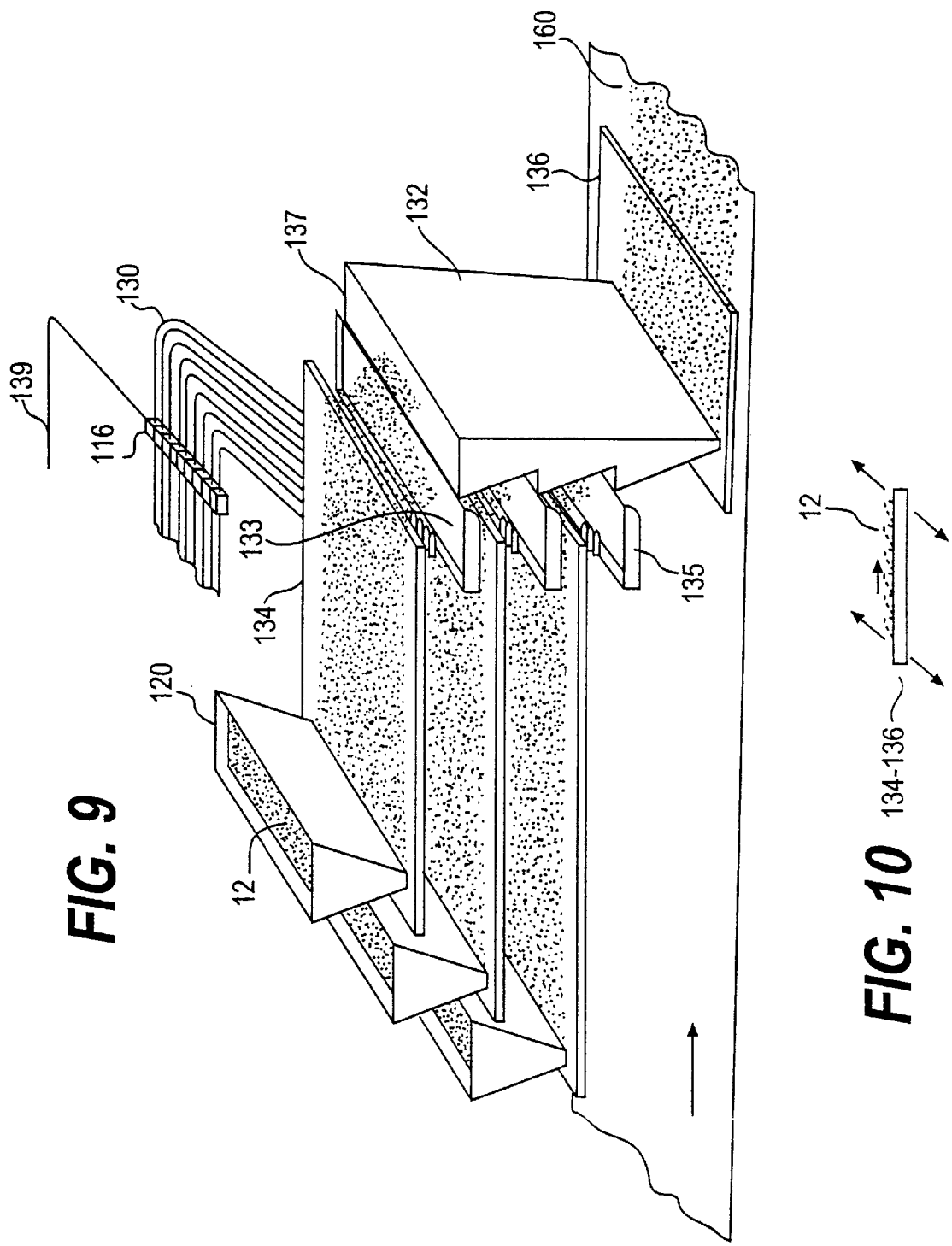

METHOD FOR MAKING A SLIP-RESISTANT COVER SYSTEM

This is a divisional application of U.S. Ser. No. 08/712,556, filed Sep. 13, 1996, now U.S. Pat. No. 5,787,665, which is a continuation-in-part application of U.S. Ser. No. 08/431,823, filed May 1, 1995, now U.S. Pat. No. 5,613,332, which is a File Wrapper Continuation of U.S. Ser. No. 07/943,554, filed Sep. 11, 1992, now abandoned.

FIELD OF THE INVENTION

The invention relates to cover systems and method for making cover systems. Specifically, the invention relates to a floor system that can be slip-resistant when wet and a method for making such a slip-resistant floor.

DESCRIPTION OF THE BACKGROUND ART

Hard floor surfaces are, typically, durable and easily maintained. It is desirable for floors in high traffic areas to clean easily and withstand years of wear without losing their aesthetic appearance.

Ceramic tiles have been utilized for thousands of years to provide decorative hard floor surfaces. Ceramic tiles are secured to a base surface by a fastening or adhesive agent. A grout or mortar is installed between the ceramic tiles.

Ceramic tiles and other hard floor surfaces are easily maintained and withstand heavy traffic, but such floors can be slippery when soiled or wet. This problem is especially dangerous for floors in doorways, kitchens, and bathrooms where soil, such as oil, grease, sand, or water, can be deposited onto the floor.

The "slip resistance" of a floor can be increased by an abrasive surface. Abrasive surfaces can be incorporated into certain floor surfaces by mixing sand, aluminum oxide, carbide particles, or another grit in paint and painting the floor surface with the mixture. The surface coefficient of friction or "COF" of sand is higher than the surface coefficient of friction for a painted surface. However, when sand is mixed into paint, the paint coats the sand and reduces the surface coefficient of friction of the sand. An exposed surface of the sand can be provided to a floor surface by distributing sand onto a wet painted floor surface. Such a non-slip floor surface does not resist heavy traffic and is not aesthetically pleasing. A sand-covered painted surface can be suitable for an exterior floor surface such as concrete, but it is undesirable for most interior floor surfaces. Interior floor surfaces must withstand heavy traffic and an aesthetic appearance and feel on, for example, bare feet. Painting an interior floor with a grit-containing paint is neither an effective nor an aesthetic solution to preventing slipperiness on an interior floor surface.

U.S. Pat. No. 3,676,208 to Griffin discloses a floor surface wherein glass spheres are incorporated into a surface adhesive film. An epoxy-type resin containing a significant concentration of minuscule solid spheres, such as glass beads, is coated onto a floor surface. This grit-containing epoxy mixture increases the slip resistance of the floor, but it does not provide sufficient slip resistance when heavily coated with water or grease.

The background art of coating floor surfaces to increase slip resistance is undesirable because the character of the floor surface is permanently changed. Coating a floor surface with a grit-containing paint makes the floor surface abrasive. The abrasive surface traps dirt and can damage cleaning equipment.

The industry lacks an inexpensive cover system and, particularly, a slip-resistant floor that can be easily cleaned and quickly installed.

SUMMARY OF THE INVENTION

The invention is a cover system. The cover system includes a polymer layer or adhesive film. The invention includes a plurality of spherical particles or "beads" partially embedded into the polymer layer.

The invention also includes a method for manufacturing a cover system such as a slip-resistant floor. The method includes the steps of impacting a softened polymer film with a plurality of beads such that at least one-half of an average volume or surface area of the bead embeds into the softened polymer film. The softened polymer film is hardened or cured.

BRIEF DESCRIPTION OF THE DRAWINGS

FIG. 2 illustrates a production line for incorporating a slip-resistant coating onto a polymer film.

FIG. 7 illustrates a production line for incorporating a decorative slip-resistant coating onto a polymer film.

FIG. 8 illustrates a means for scanning a color image and generating a control output signal.

FIG. 9 illustrates a means for selectively ejecting beads into a polymer film.

FIG. 10 illustrates a cross section of the vibratory feeder plates and the associated bead movement of FIG. 9.

DETAILED DESCRIPTION OF THE INVENTION

Figure 1:
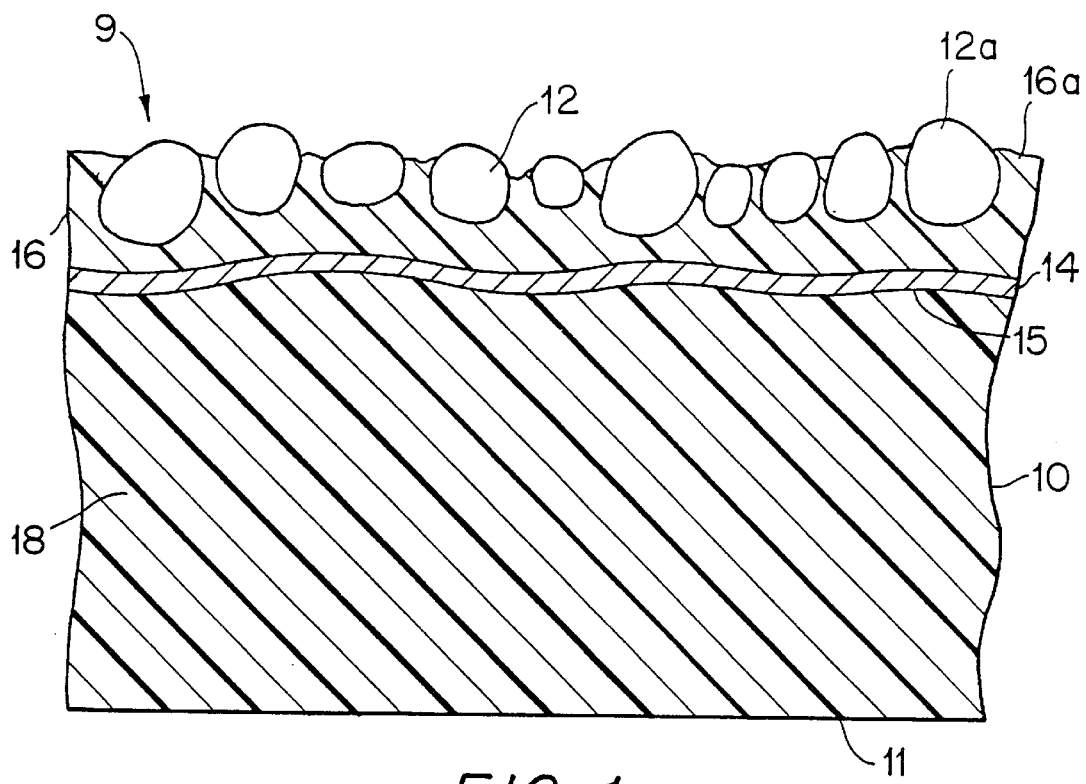
FIG. 1 illustrates a cross section of a floor mat constructed according to the invention.

The invention is a cover system and a method for manufacturing the cover system. The cover system includes a polymer layer or adhesive film. Desirably, the polymer film is integral or bonded to one side of a base layer. The invention includes a plurality of spherical particles or "beads" partially embedded into the polymer film. When the cover system is for use as a floor mat, the floor mat can provide a slip-resistant surface having a decorative, colored design. The floor mat is especially useful when an aesthetically pleasing slip-resistant floor is desired such as on a boat or other vehicle or in a supermarket, hotel, or bathroom.

The invention is also a method for manufacturing a cover system such as a slip-resistant floor. The method includes the steps of impacting a softened polymer film with a plurality of beads such that less than one-half of an average volume or surface area of the beads protrudes from the softened polymer film. The softened polymer film is hardened thermoplastic or cured thermoset. An embodiment of the method for manufacturing the cover system is desirable because an image can be scanned at a remote location and transmitted electronically to a production facility. The method for duplicating an image readily permits the production of a customized slip-resistant floor.

The preferred embodiment of the cover system is a fixed slip-resistant floor. The fixed slip-resistant floor is preferred since it is installed permanently and is used the same as any other flooring material. The fixed slip-resistant floor can be installed to cover the floor surface of an entire room or only a portion of a room such as a walk path. However, the cover system with non-abrasive beads, such as plastic beads, can provide a "self-lubricated" liner for slides and chutes in various industries.

An alternative embodiment of the cover system is a rigid or firm portable floor mat. The floor mat is appropriate for relatively small areas that are prone to becoming wet and/or greasy. Floor mats can be placed in areas that are slippery without physically altering the original surface of the floor or walkway. Floor mats can also be rolled up and set aside or removed in order to clean the floor.

Another alternative embodiment of the cover system is a padded floor mat. The padded floor mat is the preferred embodiment of this invention. The padded floor mat has encapsulated closed cell foam and is shock-absorbing and suitable for areas of repetitive foot traffic, such as behind bars, information booths, and customer service counters.

A monolayer of beads on a polymer film can be arranged in a random order or in a multicolored image. The beads are embedded into the polymer film so that at least one-half of each bead sinks into the polymer film. The beads can be embedded into a polymer film on a base layer of the cover system. The base layer can be a multilayered laminate. A multilayered laminate has a polymer film in an upper layer. The beads are embedded into the upper layer of a multilayered web. The selection of the base layer can be a belt or laminated material that determines the structural characteristics of the final cover system.

The beads are deposited as a monolayer into the polymer film. Desirable polymers for this polymer film include thermoplastic polymers, especially those of polyurethane.

The adhesion of the polymer film to the beads must be sufficient to hold the beads during processing as well as later when in service. Also, the polymer film or adhesive must be sufficiently fluid to enable the beads to sink into it upon impact. The polymer film, however, cannot be adversely affected by process temperatures.

The thickness of the softened polymer film can be any thickness, but is desirably more than the average diameter of the selected beads. The preferred embodiment of the invention includes a softened polymer film that is 60 percent to 90 percent of the average diameter of the beads. The section of the beads protruding from the softened polymer film is approximately 40 to 10 percent of the average volume of the beads.

The beads can be any material that can be embedded into the softened polymer film. The beads used in cover systems for floors have a sufficient coefficient of friction to provide a slip-resistant surface. The beads are, preferably, made of particles that have sufficient toughness and hardness to resist wear. Desirable beads have an approximate Mohs hardness of over 6.5 versus 5.5 for average glass. Also, desirable beads provide a coefficient of friction above 0.5 with both leather and rubber when wet or dry.

The beads are approximately 10 to 40 mils in average diameter depending upon the desired character of the cover system. Preferably, the beads are approximately 20 to 30 mils in average diameter. A concentration of approximately 200 to 1,100 beads per square inch of this diameter provide a sufficient coefficient of friction for a cover system. A preferred concentration of beads of this diameter is approximately 600 beads per square inch.

The beads for slip-resistant surfaces can be organic or inorganic, including a member selected from the group consisting of ceramics, flint, garnet, quartz, sand, and mixtures of these. Organic materials, including polymers, can be used as beads.

The beads of the preferred embodiment are semi-precious stone. Garnet is preferred because it is hard, durable, inexpensive, and polished easily. Garnet, typically, has a Mohs hardness of approximately 8.

The beads of an alternative embodiment are quartz. Quartz is not as hard or as durable as garnet. However, quartz is available in a variety of colors.

The beads of another alternative embodiment are ceramic. Sintered ceramic beads are hard, tough, and exceptionally durable. Unlike most other ceramic materials, ceramic beads are not friable. Sintered beads can be produced with a controlled, textured surface by grinding the ceramic material, pelletizing, and sintering the ceramic pellets in a rotary kiln at about 2,500° F. The surface provides a high coefficient of friction without a "soil-holding grindstone-like surface." The ceramic bead surface can be varied from smooth to rough by particle selection and process temperature control to customize or balance slip resistance versus ease of cleaning. In contrast, aluminum oxide or carbide particles in floor surfaces typically have sharp angular shapes, good for slip resistance, but very difficult to clean. The sintered ceramic beads have an approximate Mohs hardness of 7.5 and a diameter of approximately 20 to 30 mils. Some other desirable ceramic beads can be natural or synthetic ceramics, including a member selected from the group consisting of metal oxides, alumina, aluminum silicate, silicon carbide, silicon nitride, and mixtures of these.

The cover system of another alternative embodiment of the invention is a firm floor mat. The upper polymer layer of the firm floor mat can be polyurethane. Polyurethane is a desirable material for a cover system because polyurethane provides superior bead adhesion, excellent hydrolitic stability, toughness, and flexibility under a wide range of temperatures.

The base layer of a multilayered laminate can include combinations of numerous materials. A lower layer of metal, ceramic, wood, and/or rigid polymer provides tiles for a cover system. A lower layer of fiberglass and/or flexible polymer provides a flexible cover system. A lower or intermediate layer of a foam polymer provides shock-absorbing cover system.

FIG. 1 illustrates a cross section of a floor mat 10 constructed according to the preferred embodiment of the invention. The floor mat 10 includes a sheet of woven roving fiberglass 14 and a polyurethane layer 16. The polyurethane layer 16 on one side is embedded with beads 12 and bonded to the beads 12. A backing composition 18 is bonded to the other side of the polyurethane layer 16. An upper surface 9 of the floor mat 10 is slip-resistant to foot traffic. An underside surface 11 of the floor mat 10 has a tacky or adhesive characteristic to resist sliding against a floor surface. A high coefficient of friction on an upper surface 9 results from the exposure of the crowns 12a of the beads 12 above the polyurethane layer 16.

The polyurethane layer 16 has an initial thickness of 15 to 20 mils, but the thickness changes as the result of displacement by the beads 12 during the embedding procedure. The polyurethane layer 16 is, desirably, sufficiently thick to permit at least one-half of the surface area of the beads 12 to be embedded in the polyurethane layer 16. It is preferable that the beads 12 be embedded from about 60 percent to about 90 percent of their size or volume in the polyurethane layer 16. This range of embedding permits approximately 10 percent to 40 percent of the volume of the beads 12 to be exposed above the surface 9 of the floor mat 10.

The upper surface 9 in this embodiment of the floor mat 10 has a texture or surface contour. The texture or surface contour results from the woven roving fiberglass 14. The woven roving fiberglass 14 has a coarse weave of a crisscross pattern on its surface. The polyurethane layer 14 partially assumes the crisscross pattern of the woven roving fiberglass 14 and results in a wavy appearance in the upper surface 16a of the polyurethane layer 14. The surface is also textured by the bead crowns 12a of the beads 12. However, the transition from bead crowns 12a to the upper surface 9 of the polyurethane layer 16 is relatively smooth. The smooth surface prevents the capture of dirt or other matter. Accordingly, surface 9 of the floor mat 10 is easy to clean while remaining slip-resistant.

The depth of the beads 12 can be varied depending upon the application of the cover system. If the beads 12 are embedded too deeply, the bead crowns 12a are insufficiently exposed and slip resistance is decreased. If the beads are not embedded deep enough in the polyurethane layer 16, the upper surface of the floor mat 10 is rough and difficult to clean. Also, if the beads 12 are not embedded at least 50 percent of their volume into the polyurethane layer 16, the beads 12 can break loose from the floor mat 10. Properly embedded beads 12 remain incorporated in the polyurethane layer 16 even when exposed to water, detergents, oil, grease, and the like.

The adhesion of the beads 12 can be improved by adding a silane, for example, a γ-glycidoxypropyltrimethoxysilane, as a coupling agent. A coupling agent bonds the beads 12 to the polyurethane.

The combination of the woven roving fiberglass 14 and the polyurethane layer 16 as well as the polyurethane backing layer 18 provides the floor mat 10 with significant shear strength and tear strength. The floor mat 10 of this embodiment of the invention cannot be shredded, torn, or cracked during normal use. Further, the flexible and durable properties of the floor mat 10 remain in temperatures below −20° F., such as found in walk-in freezers.

The woven roving fiberglass 14 in the preferred embodiment of the invention is at least 16 ounces per square yard and, preferably, 18 ounces per square yard. The woven roving fiberglass 14, desirably, has a "tight" 5 by 7 weave of machine direction by cross-machine direction. A fiberglass layer of eight ounces or less per square yard provides little resistance to shearing when saturated with resin. Saturation of both sides of the woven roving fiberglass 14 with polyurethane forms an impermeable and a relatively non-porous floor mat 10.

FIG. 2 illustrates a production line for the floor mat 10. A roll of woven roving fiberglass 14 is fed in an overlapping relationship with a roll of thermoplastic polyurethane layer 16. The two sheets travel together through a first heater 20 located between rolls 22 and 23. The first heater 20 heats the polyurethane layer 16 to about its transition temperature or melting point. The heating of the grade of polyurethane layer 16 used in this embodiment of the invention is at a maximum temperature of about 425° F. The first heater 20 heats the two layers by convection heat for a period of time sufficient to bond the two layers together.

The "combination web" of the woven roving fiberglass 14 and the polyurethane layer 16 passes along the line to a means for embedding beads 30. The beads 12 are partially embedded into the polyurethane layer 16 by the means for embedding beads 30.

The combination web travels around a roll 24. The tension of the combination web about roll 24 can be used to apply pressure to the beads 12 and further embed the beads 12 into the polyurethane layer 16. The combination web then enters a second heater 40. The second heater 40 adjusts the depth of immersion of the beads 12 within the polyurethane layer 16 and controls the rate of absorption of the polyurethane layer 16 into the woven roving fiberglass 14. The second heater 40 heats the combination web to a maximum of temperature of about 425° F. and softens the polyurethane layer 16 such that approximately 60 percent to 90 percent immersion or embedding of the average volume or surface area of the beads 12 into the polyurethane layer 16 occurs. The further immersion of the beads 12 into the polyurethane layer 16 is accomplished by gravity in this embodiment of the invention.

The operational temperature of the second heater 40 is a temperature sufficient to bond the layers of the combination web. A radiant heater can be used that heats the surface of the polyurethane layer 16 to a maximum temperature of 425° F. for a short period of time or, for example, one-half minute. The exact time and temperature are set in accordance with the materials being processed.

It is undesirable for the polyurethane layer 16 to become so hot as to be completely absorbed into the woven roving fiberglass 14. The underside surface 11 of the woven roving fiberglass 14 can remain partially unsaturated to assist with later bonding to a backing composition. Insufficient absorption, however, can cause voids or allow fibers of unsaturated fiberglass to protrude from the product. A temperature differential of at least 36° F. between the upper surface and the underside 15 of the woven roving fiberglass 14 is desirable for proper saturation.

The combination web of woven roving fiberglass 14 and polyurethane layer 16, upon exiting the second heater 40, is permitted to cool so that the beads 12 set in the hardened polyurethane layer 16. The product passes over roll 47 to a take-up roll 48.

An alternative embodiment of the invention embeds the beads 12 in a simple geometric pattern. A stationary mask (not shown) having a plurality of slots extending in the direction of the path of travel of the combination web, can be placed between the cloud of beads 12 and the polyurethane layer 16. The slots in the mask impart a striped pattern of beads onto the surface of the polyurethane layer 16. Another embodiment has a mask that moves at the same speed as the combination web. This moving mask is between the cloud of beads 12 and the polyurethane layer 16. A moving mask imparts a design, such as a tile pattern, onto the combination web. This moving mask can be on a conveyor belt that passes in close proximity to the polyurethane layer 16.

Figure 3:
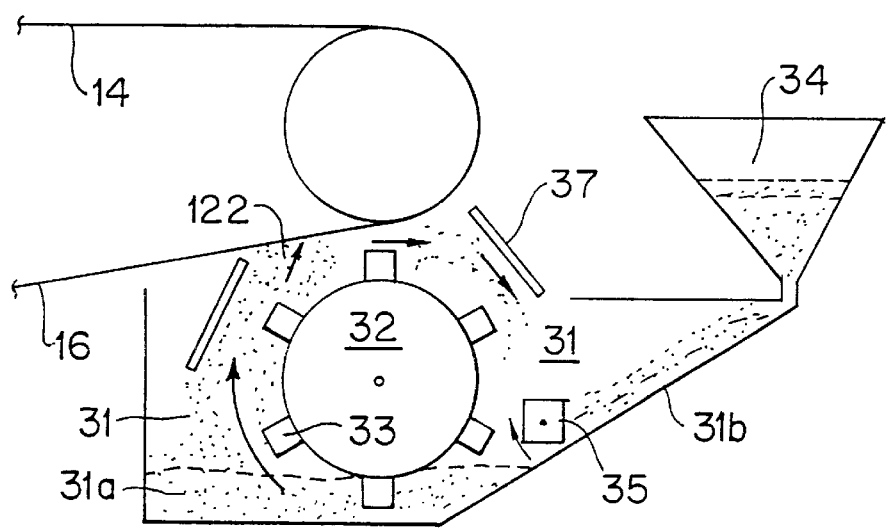
FIG. 3 illustrates a side view of a means for embedding beads into a polyurethane or similar polymer film or adhesive.

FIG. 3 illustrates the combination web of woven roving fiberglass 14 and polyurethane layer 16 exiting the first heater 20. The combination passes along the line to a means for embedding beads 30. The polyurethane layer 16 reaching the means for embedding beads 30 is soft and tacky and faces downward into a bead slinging containment area 31.

A paddle wheel 32 travels within the bead slinging containment area 31 in the direction of the arrow as shown. The paddle wheel 32 projects beads 12 from the bottom of the bead slinging containment area 31 and impinges the beads 12 into the polyurethane layer 16, thereby embedding the beads 12 in the polyurethane layer 16.

A desirable dispersion of bead density is between 200 beads per square inch and 1,100 beads per square inch. The selection of the surface characteristics of the beads 12 and of the density of the beads 12 embedded in the polyurethane layer 16 determines the slip resistance of the resulting floor mat 10 as well as the ease of cleaning of the floor mat 10. Controls (not shown) are incorporated in the means for embedding beads 30 to enable accurate adjustment and control of the dispersion of bead density.

The feed rate of beads 12 is controlled by the speed of rotation of feed bar 35. As the beads flow from the hopper 34 along the sloped surface 31b of the containment area, they are fed past the rotating bar 35 into the bottom of the bead slinging containment area 31. Rapid rotation of a paddle wheel 32 causes the paddles 33 to strike the beads 12 and throw the beads 12 upward into the polyurethane layer 16.

The rotation of the paddle wheel 32 creates a cloud of beads 12. Most of the beads 12 impact the polyurethane layer 16 and are embedded therein. A number of the beads are thrown into a first baffle plate 36 or even further into a second baffle plate 37. The first baffle plate 36 prevents the beads from ejection from the bead slinging containment area 31. The angle of the baffle plate 37 can be adjusted to cause deflected beads to land upstream of feed bar 35 or downstream therefrom. The deflected beads 12 are directed upstream of the feed bar 35.

The non-embedded beads are removed from the cloud of beads 38 by the paddle wheel 32 and fed into the bottom of the bead slinging containment area 31. The speeds of the rotating feed bar 35 and the paddle wheel 32 as well as the angle of the second baffle plate 37 permit adjustment or control in the density of the cloud of beads 38. An even dispersion of the beads 12 across the width of the traveling polyurethane layer 16 is achieved by maintaining a constant supply of the beads 12 across the width of the paddle wheel 32 from a supply hopper 34. An even dispersion of the beads 12 across the width of the floor mat 10 provides a constant coefficient of friction on the surface of the floor mat 10.

Figure 4:
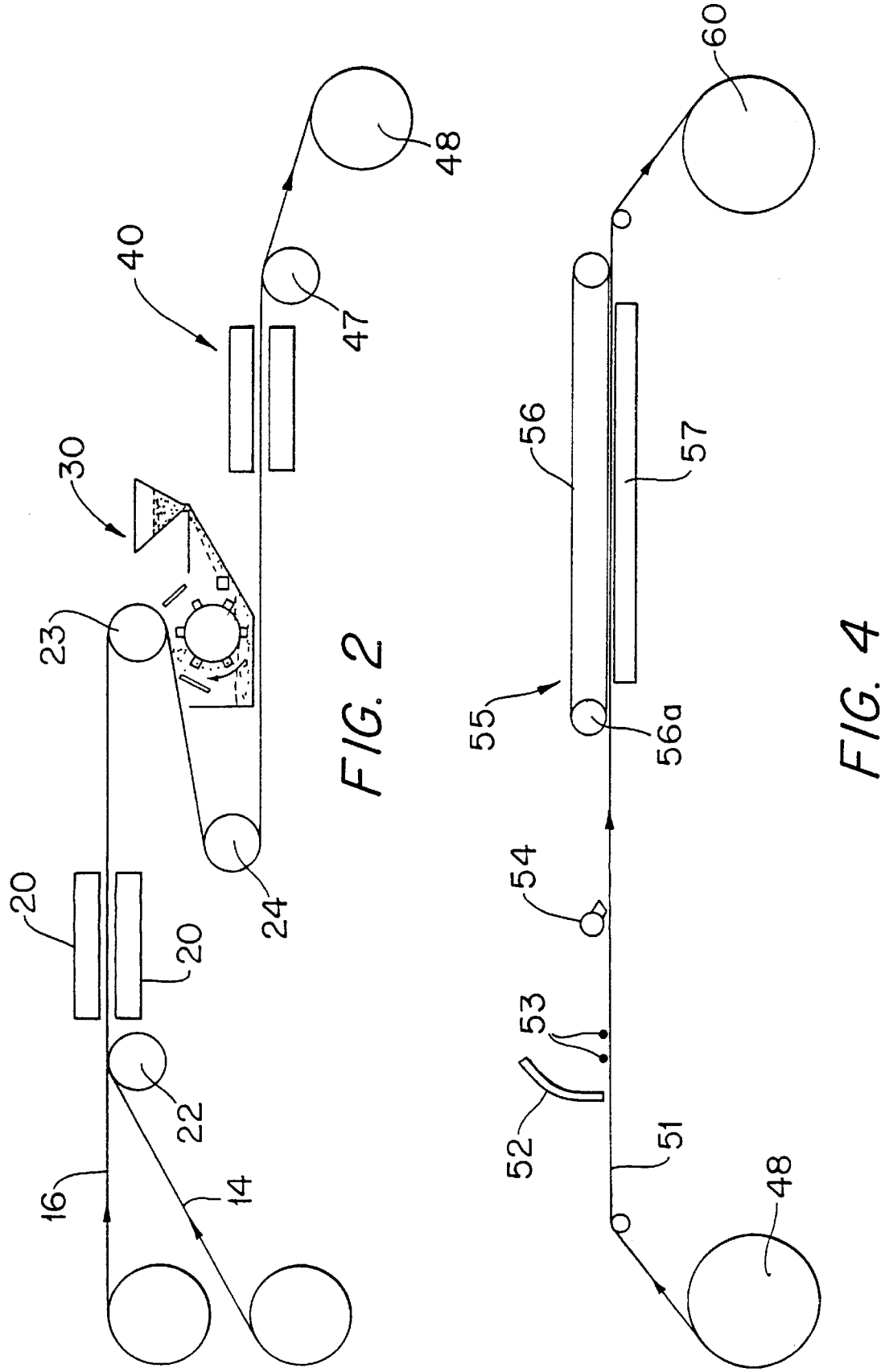
FIG. 4 illustrates a production line for adhering a backing composition to the bead-coated polymer film of FIG. 2.

FIG. 4 illustrates a production line for adhering a backing composition 18 to the underside 15 of woven roving fiberglass 14 to complete the floor mat 10. The bead-embedded combination web of the woven roving fiberglass 14 and polyurethane layer 16 in the "let-off roll" 48 is unrolled onto a table 51. The backing composition 18 is then applied through a mixer nozzle 52. Once the backing composition 18 is applied to the underside 15 of the woven roving fiberglass 14 of the combination web, the composition is smoothed by cable smoothers 53. The cable smoothers 53 are cables stretched across the width of the table 51 and slightly submerged into the backing composition 18. The backing composition 18 at this stage is liquid and the cable smoothers 53 flatten the liquid and release gas bubbles from the backing composition. A blower 54 distributes a jet of air onto the surface of the backing composition 18 and further removes air bubbles from the backing composition 18. Downstream from the blower 54 is a curing station 55. The curing station 55 includes a TEFLON® brand or other fluorohydrocarbon roller belt 56 and a heater block 57. The height of the roller belt 56 can be adjusted to provide a selected thickness of the backing composition 18. The thickness of the backing composition 18 is, preferably, 50 to 100 mils depending upon the intended application of the floor mat 10.

The roller belt 56 maintains pressure on the backing composition 18 as the backing composition 18 passes over the heater block 57. The heater block 57 is a conduction heater and provides heat to the polyurethane layer 16 at a relatively low temperature or, for example, 160° F. The heater block 57 can be heated by hot water or electricity.

The backing composition 18, upon exiting the curing station 55, is cured, and the floor mat 10 is complete. The completed floor mat 10 is wound around another take-up roll 60. In order to provide commercially marketable floor mats, the edges of the floor mats are trimmed, and the floor mat is cut into selected lengths.

Figure 5:
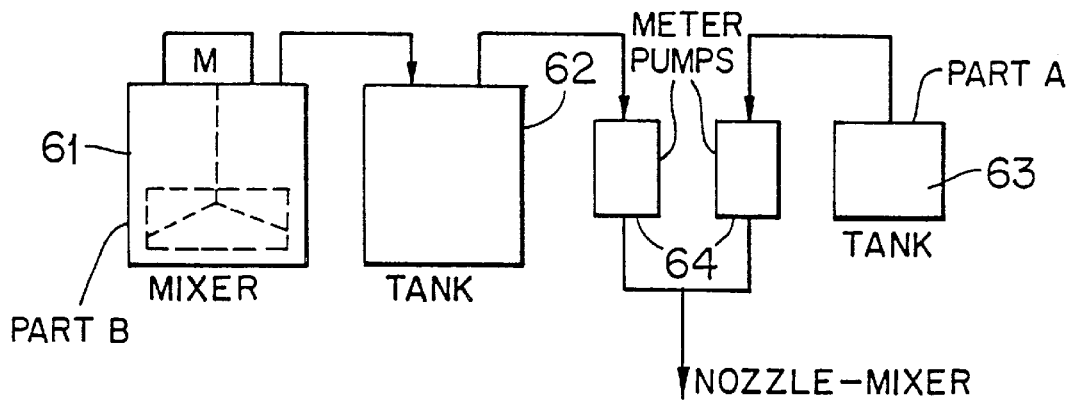
FIG. 5 illustrates a block diagram of the process for producing a backing composition.

FIG. 5 illustrates a block diagram of the process for producing the backing composition 18. The ingredients for the backing composition 18 are mixed in a mixer 61. A polyol is mixed with a filler, such as clay or calcium carbonate. The additives to the polyol must be as dry as possible to prevent the formation of gas bubbles when mixed with isocyanate. A color additive can also be added to the mixture. The mixer 61 is a high shear mixture that homogeneously combines the added ingredients. The mixture is pumped from mixer 61 into a first tank 62 and forms a first part of a two-part polyurethane backing composition.

The second part of the two-part polyurethane composition is isocyanate and is contained in a second tank 63. Upon application of the polyurethane backing, the isocyanate from the second tank 63 and the polyol mixture from the first tank 62 are pumped through meter pumps 64 in controlled quantities and mixed together by the static mixer 52. Commercially available polyurethanes can be applied as the backing composition. Polyurethane mixtures are heat curable at various temperatures.

Desirable embodiments of the invention apply a 50 to 100 mil mixture of isocyanate and polyol or "backing composition" to the underside 15 of the woven roving fiberglass 14. Curing temperatures for such backing compositions are from ambient temperature to about 180° F. The backing composition 18 in desirable embodiments of the invention is applied directly to the underside 15 of the fiberglass in the combination web.

Figure 6:
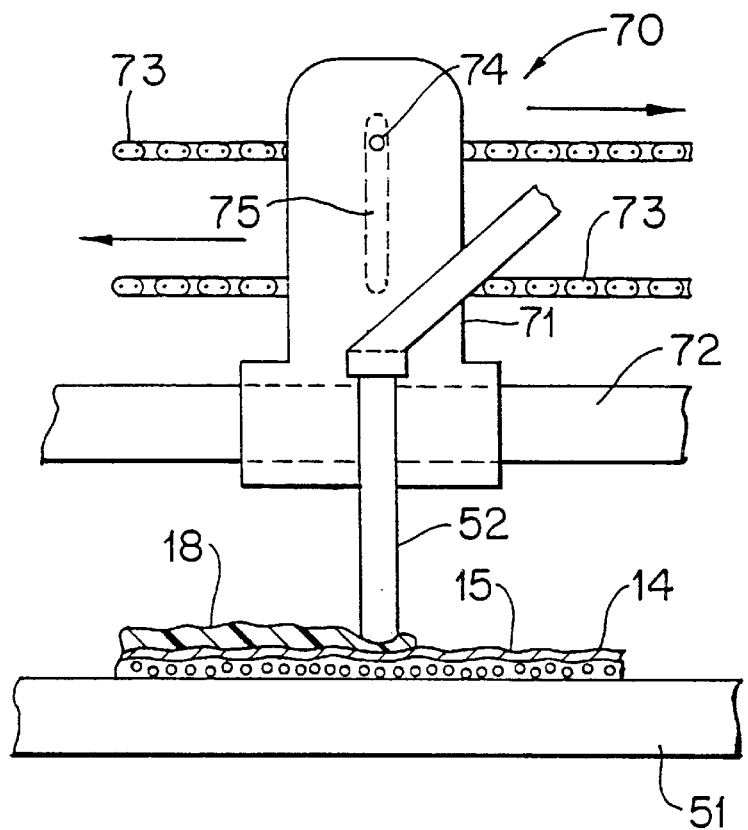
FIG. 6 illustrates an application device for applying the backing composition to an underside surface of fiberglass.

FIG. 6 illustrates an application device for applying the backing composition 18 to the underside of the combination web. A nozzle transport means 70 reciprocates across the width of the table 51. The static mixer nozzle 52 is mounted to a carriage 71 and is guided in movement along a shaft 72. The reciprocating movement of the carriage 71 is performed by joining the carriage 71 to a chain 73 at a pin joint 74. The pin joint 74 travels within a slot 75 in the carriage 71. The chain 73 travels between two sprockets (not shown) as the pin joint 74 reciprocates within slot 75 in the direction of the arrows as shown in the figure. The reciprocating motion of the mixer nozzle 52 forms a zigzag pattern on the woven roving fiberglass 14 of the combination web. This pattern is pressed by the cable smoothers 53 and is not noticeable in the final product. Alternative devices to the nozzle transport means 70 can be used.

The backing composition 18 has a rapid curing time after mixing in the static mixer nozzle 52. For this reason, the backing composition is deposited directly onto the fiberglass instead of the conventional method of coating a moving fiberglass web through a resin. The conventional method does not remove trapped air from the nonporous polyurethane layer 16. Trapped air can produce delamination of the backing composition and cause porosity in the finished mat.

FIGS. 7 through 14 illustrate the device and method for applying a decorative pattern of beads onto a slip-resistant cover system. Certain embodiments of the decorative slip-resistant cover system can use smaller beads than those described above.

FIG. 7 illustrates a production line for incorporating a decorative particulate coating onto a polymer film. The components of this production line are identical to those components described for FIG. 2 except that the means for embedding beads 30' applies a decorative pattern of beads 12 to the polymer layer 16. The means for embedding beads 30' is a means for selectively ejecting beads of different colors and/or sizes. The means for embedding beads 30' receives control signals from a microprocessor (not shown) and distributes the beads 12 according to their size and/or color.

FIG. 8 illustrates a device for scanning a colored image and generating a control output signal for that image. A conventional scanner 100 is used to scan an image such as a colored image 102 by moving a scanner sensor 104 over the colored image 102. The scanner 100 generates a corresponding image and transmits that image to a conventional microprocessor 106. Conventional software can operate the scanner 100 and the microprocessor 106. The Mustek company manufactures a scanner that reads an 8½ by 11 inch area. Alignment of a plurality of theses scanners can cover large areas. The data from the scanned area can then be oriented in the microprocessor.

The microprocessor 106 arrays the total image into a grid having a plurality of two-dimensional sectors. The two-dimensional sectors are preferably in the shape of squares. The microprocessor 106 converts the color of the scanned image in each sector into a corresponding primary color. The microprocessor 106 generates a control output signal for each color in each grid sector. The control output signal is responsive to the primary color of the converted, scanned image in each sector.

The microprocessor 106 can transmit the control output signals through a modem 108 and telephone lines, if necessary, to a local microprocessor 110. The local microprocessor 110 is located in the cover system manufacturing facility. The local microprocessor 110 transmits control output signals through cables 112 to the amplifiers 114. The amplifiers 114 feed control signals to the dispersing solenoid valve via lines 118. The Aro company manufactures a valve that operates at over 60 cycles per second at 100 p.s.i. with a life of over 20 million cycles.

The amplified signals are isolated from the unamplified control output signals by an integrated circuit (not shown). The isolation of the control output signals in this manner prevents an electrical surge from damaging the local microprocessor 110.

The number of valves required by particular embodiments of the invention can be simplified. Simplification can be accomplished through a data highway. The DeviceNet product sold by the Allen-Bradley company establishes one wire communication from their PLC or pneumatic logic controller to a manifold of a plurality of solenoids.

FIG. 9 illustrates a means for selectively ejecting beads into a polymer film 160. A plurality of hoppers 120 are arranged in a row. Each hopper 120 contains a single color of beads 12. Each hopper 120 contains beads 12 of a different color and/or size from the beads 12 contained in another hopper 120. The polyurethane layer 160 is conveyed beneath the row of hoppers 120. The microprocessor 110 is programmed to actuate the solenoid valves 116 that direct proportional amounts of air to locate beads to fill each pixel in layer 160 with the correct color spacing and number of beads.

The beads move from the bin 120 into a vibrating feeder 134 in a direction shown by the dotted lines. The Syntron company manufactures vibrating feeders suitable for use with the invention. The table conveys an even layer of the beads and moves the beads forward one bead deep in an orderly controlled motion towards the return bin 135. The velocity of bead ejection is controlled by amplitude and/or frequency of vectors. The beads fall at the end of the table into the bin 135 and are returned to the hopper 120 or are directed forward 137 into the locating chute 132 by a small jet of controlled gas, such as air, from nozzles 133. Air is fed from a line 139 into solenoid valves 116 controlled by a microprocessor 110 to nozzles 133 via lines 130. Beads of a single color, from one hopper or multiple colors from several hoppers can be dropped through the locating chute 132 onto the vibrating collector feeder 136.

FIG. 10 illustrates a cross section of the vibratory feeder plates and the associated bead movement of FIG. 9. The movement of the feeder 136 is similar to the movement of the feeder 134. Both feeders move forward and control the flow and the spacing of the beads from the end of the feeder 136 into the softened polymer 160. The preferred embodiment of the invention uses a three-foot wide transfer web with pixels one-quarter inch square. This arrangement requires 144 pixels with accompanying control valves and nozzles per color of beads. A polymer web running at 30 inches per minute requires a single bead control jet of air every one-half second. Higher web speeds and/or smaller pixels with greater design detail can be achieved by modifying this basic structure. Bead colors can be primary colors so that a scanned image 102 is duplicated in a corresponding color pattern of beads 160 with more than one color per pixel.

I claim:

1. A method for manufacturing a cover system comprising:
    embedding a plurality of beads into a polymer film;
    setting said embedded beads into said polymer film whereby a substantial concentration of said embedded beads have less than one-half their surface area exposed protruding from said polymer film;
    curing or hardening said polymer film;
    wherein said embedding of said beads forms a pattern on said polymer film; and
    wherein said embedding includes filtering said beads through a mask.

2. The method of claim 1 wherein said embedding includes embedding at least two groups of beads having different colors.

3. The method of claim 2 wherein said embedding includes embedding at least two groups of beads having different sizes.

4. A method for manufacturing a cover system comprising:
    embedding a plurality of beads into a polymer film;
    setting said embedded beads into said polymer film whereby a substantial concentration of said embedded beads have less than one-half their surface area exposed protruding from said polymer film;
    curing or hardening said polymer film;
    wherein said embedding of said beads includes embedding at least two groups of beads having different colors and forms a pattern on said polymer film with respect to said colors.

5. The method of claim 4 further comprising a first step of:
    forming a base layer, said base layer having a first side and a second side, said polymer film being bonded onto said first side of said base layer.

6. The method of claim 5 further comprising a final step of adhering a backing composition onto said second side of said base layer.

7. The method of claim 4 wherein said embedding includes embedding at least two groups of beads having different sizes.

8. A method for manufacturing a cover system comprising:

embedding a plurality of beads into a polymer film;

setting said embedded beads into said polymer film whereby a substantial concentration of said embedded beads have less than one-half their surface area exposed protruding from said polymer film;

curing or hardening said polymer film;

further including:

scanning an image;

transmitting said scanned image to a central microprocessor;

arraying said image into a grid including a plurality of two-dimensional sectors;

generating a control output signal for each grid sector responsive to said image in each grid sector;

orienting, controlling, and positioning said beads with vibratory feeders;

directing said beads from said vibratory feeders to said polymer film using a pneumatic nozzle;

converting said control signal into a proportional pneumatic output to control the directing of said beads according to characteristics of said beads for each grid sector; and wherein said embedding includes embedding said beads to reproduce said scanned image.

9. The method of claim 8, wherein said scanning includes scanning said image at a remote location from said central microprocessor and said transmitting of said scanned image is via a modem connection to said central microprocessor.

10. The method of claim 8, wherein said embedding includes embedding at least two groups of beads, each group having at least one of different colors and different sizes as said characteristics of said beads.

* * * * *